F. VAN INWAGEN.
METHOD OF MACHINING THERMOSTATIC MEMBERS.
APPLICATION FILED MAY 14, 1915.
1,193,637.
Patented Aug. 8, 1916.
2 SHEETS—SHEET 1.
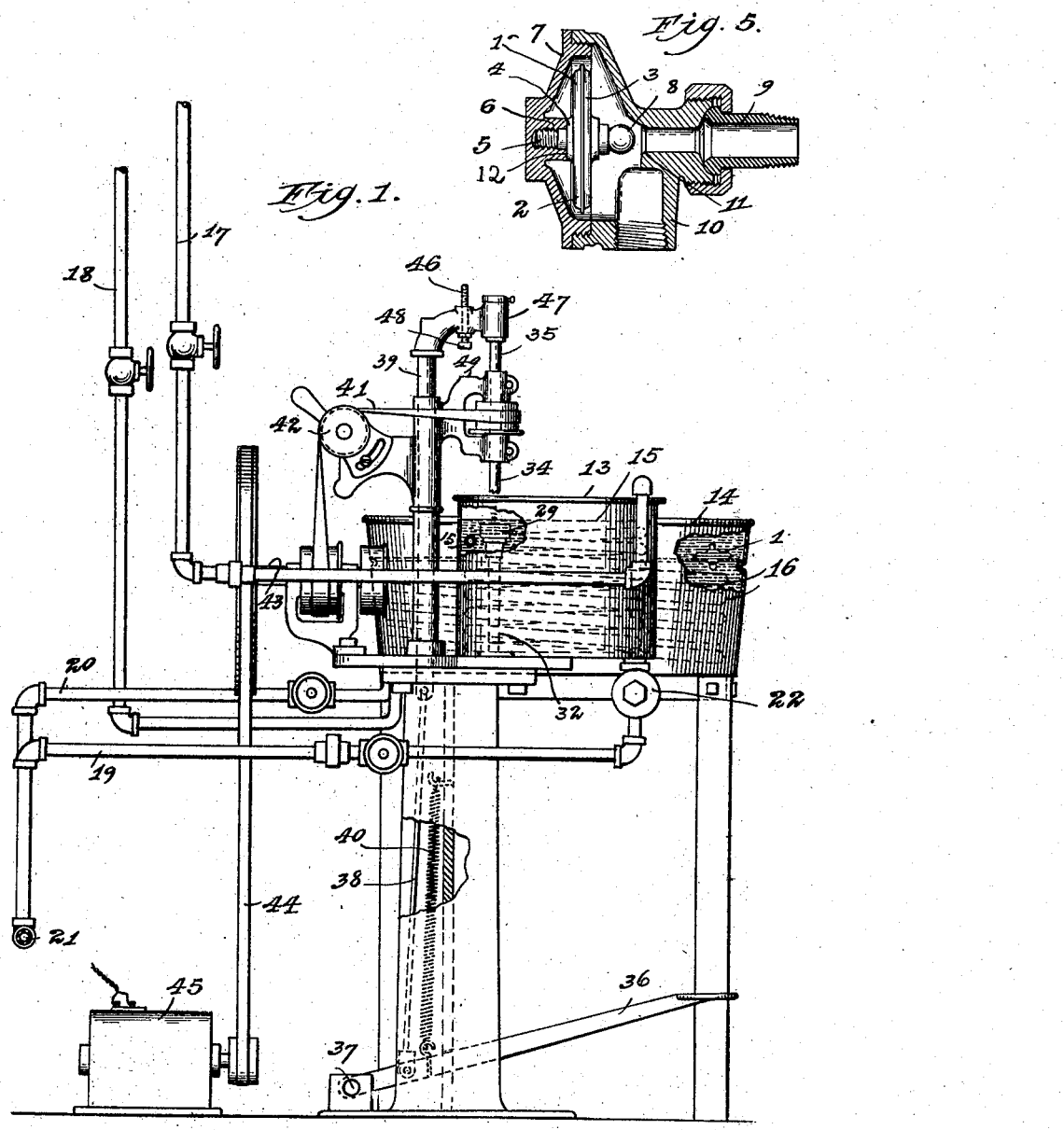
Witness,
B. Mann
Inventor,
Frank Van Inwagen
By Frank L. Belknap Atty's

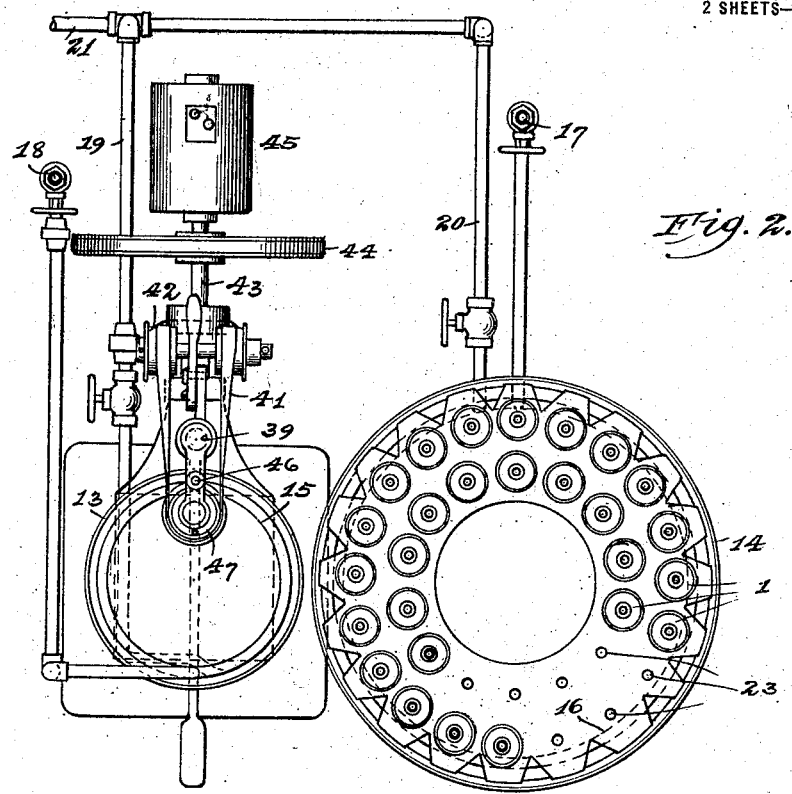
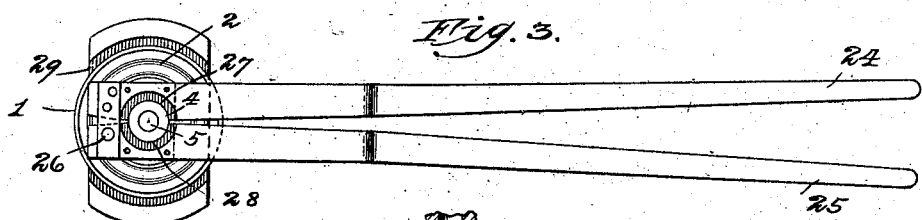
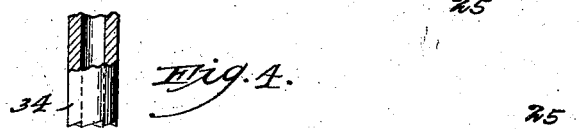
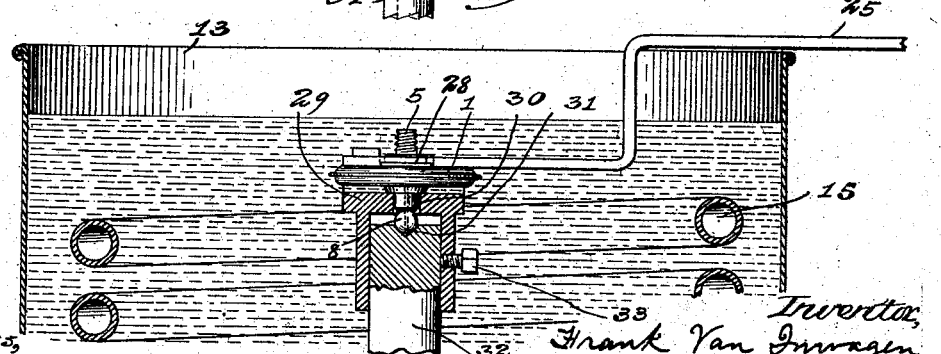

UNITED STATES PATENT OFFICE.

FRANK VAN INWAGEN, OF CHICAGO, ILLINOIS, ASSIGNOR TO ILLINOIS ENGINEERING COMPANY, OF CHICAGO, ILLINOIS, A CORPORATION OF ILLINOIS.

METHOD OF MACHINING THERMOSTATIC MEMBERS.

1,193,637.  Specification of Letters Patent.  Patented Aug. 8, 1916.

Application filed May 14, 1915. Serial No. 28,001.

*To all whom it may concern:*

Be it known that I, FRANK VAN INWAGEN, a citizen of the United States, residing in the city of Chicago, county of Cook, State of Illinois, have invented certain new and useful Improvements in Methods of Machining Thermostatic Members, of which the following is a specification.

My invention relates to improvements in methods of accurately machining to the exact depth, members which are expansible under the influence of heat, and more particularly to a means and method by which the abutment shoulder of an expansible diaphragm can be accurately machined so that the valve will, at a predetermined temperature, just press against the valve seat and close the valve opening of a thermostatic valve.

Among the salient objects of my invention are to provide a method by which the abutment shoulder of a thermostatic diaphragm can be rapidly and accurately machined, the depth to which the machining will take place being automatically governed; to provide a method of machining the shoulder of a thermostatic diaphragm so that the abutment shoulder will be cut to the desired depth and in which compensation will be made for any inequality of expansion of the diaphragm; to provide a method in which the thermostatic diaphragm is machined at the temperature at which the diaphragm will operate to close the valve; to provide a method in which the expansible diaphragms can be automatically machined to the right depth so as to correspond to a standard depth between the valve opening and the portion of the valve casing which serves as an abutment shoulder against which the machined shoulder of the diaphragm will rest; to provide a method of machining or otherwise operating upon portions of members which expand upon rise in temperature, in which the machining or other operation on the member is performed at a time when the member is in its expanded position; and in general to provide an improved method of rapidly, accurately and economically preparing thermostatic diaphragms and the like to fit in other members.

In the drawings: Figure 1 is a side elevation of a device embodying my invention.
Fig. 2 is a top plan view thereof. Fig. 3 is a plan view of the transferring tool. Fig. 4 is an enlarged fragmentary vertical section through the apparatus in which the diaphragm is held while being machined. Fig. 5 is a cross section through a thermostatic valve in which the diaphragm is employed.

Referring in detail to the construction shown in the drawings, and describing first one type of thermostatic diaphragm to the machining of which my invention is applicable, 1 designates the diaphragm which is composed of sections 2 and 3, forming a chamber within which an expansible fluid is contained. The section 2 is provided with an abutment shoulder 4 projecting from which is a threaded member 5 adapted to be screwed into a seat 6 formed in a portion of the casing 7. The section 3 of the diaphragm carries a valve 8 which controls the connection between the inlet pipe 9 and the outlet 10, as shown in Fig. 5. The valve 8 is so positioned in operative relation to the valve seat 11 that when the fluid in the diaphragm 1 expands the latter sufficiently, the valve 8 will move against the seat 11 and thus close communication between the inlet 9 and the outlet 10.

Thermostatic valves of this type are employed in low pressure vacuum heating systems and other places in which a very sensitive temperature controlled valve is required. It is, therefore, essential that the valve 8 be completely in contact with its seat 11 at the desired temperature, but that it shall not press too hard against the seat. The accurate fitting of the diaphragm in the valve casing has heretofore required great skill in that it was necessary to machine down the abutment shoulder 4 so that when it contacts with the face 12 of the seat 6, the valve will just extend to its seat at the time the diaphragm is subjected to the governing temperature.

Owing to discrepancies in the expansible qualities of the individual diaphragm it has heretofore been necessary to machine the abutment shoulder 4 to the approximate depth, then screw the diaphragm into the casing, and, if the shoulder was not cut down enough, to remachine it. This alternate measuring and remachining not only consumes considerable time and thus raises the labor cost, but it requires great skill to determine when the abutment shoulder of the diaphragm is machined sufficiently. The present invention contemplates a method by which the abutment shoulder 4 of the diaphragm is automatically machined to the desired depth and in which no special skill is required to machine the shoulder the exact amount. In carrying out my method, an apparatus is used in which the diaphragm at the time it is machined, is subjected to the governing temperature, that is, the temperature at which the diaphragms would expand sufficiently to just close the valve 8 against the seat 11.

As shown in detail in Figs. 1 and 2, I employ a pair of tanks 13 and 14, these tanks containing liquid which is heated by steam coils 15 and 16, steam being admitted to these coils from inlet pipes 17 and 18, and the water of condensation removed by pipes 19 and 20, which connect with a return pipe 21. A thermostatic valve 22, such as shown in detail in Fig. 5, is preferably employed for controlling the flow from the coils, thus insuring that the diaphragm being treated will be subjected to the temperature at which diaphragms of that type operate. The tank 14 is essentially a preheating tank and is provided with seats 23 for receiving a plurality of the diaphragms 1. The purpose of this construction is to allow a large number of the diaphragms being preheated at the same time so as to avoid delay in getting the diaphragm which is to be machined, to the desired temperature.

In machining the diaphragms, the fluid in the tanks 13 and 14 is first raised to the desired temperature, the operator then by means of the tool 24 grips the abutment shoulder 4 on one of the diaphragms and transfers it from the preheating tank 14 to the operating tank 13. This tool 24 has a movable arm 25 pivoted at 26, there being recessed gripping members 27 and 28 bolted to the arm and adapted to grip the abutment shoulder below the plane of its surface which is to be machined. The diaphragm so gripped is then removed from the tank 14 to the tank 13 and placed upon the seat 29 with the valve projecting through the aperture 30, and resting on a tapered seat 31 formed in the post 32. The seat 29 is adjustable with relation to the seat 31 by means of a set screw 33, the construction being such that diaphragms having valves of different sizes may be treated in the same apparatus.

When the diaphragm has been positioned on the seat 29 as above described, the tool 34 carried by the revoluble spindle 35 is then brought into operation in the following manner: The spindle 35 is revolubly mounted in the spindle head 47, which in turn is fixedly secured to a longitudinally adjustable shaft 39, and at its lower end this shaft is connected by a link 38 to a foot lever 36 pivoted at 37. Thus when the operator presses his foot on the lever 36, the spindle 35 is moved down until the tool 34 engages the shoulder 4 of the diaphragm 1 which is held on the seat 29. When the lever 36 is released a spring 40, acting on the lever 36 will move the shaft 39 and spindle 35 upward so that the machining tool 34 is returned to inoperative position. The spindle 35 is driven by a belt 41 extending over a belt tightener 42, and connected through the clutch shaft 43 and belt 44 with a motor 45.

As the cutting tool 34 revolves, it machines down the upper surface of the shoulder 4, and in order to prevent the latter being machined down excessively, I employ an adjustable stop 46 carried by the spindle head 47. This stop has an abutment member 48 adapted to strike against an abutment face 49 which is formed as part of the stationary frame. When the abutment member 48 strikes against the face 49, any further downward movement of the spindle 35 is prevented. By setting the stop 46 where its abutment member 48 will strike the face 49 when the machining tool is moved down toward the seat 31 so that the distance between the latter and the lower edge of the machining tool is exactly equal to the distance between the valve seat 11 and the face 12 of the casing, the diaphragm shoulder will be machined to the exact right depth. Moreover, since the diaphragm at the time of machining is subjected to the same temperature which will close the valve, the abutment shoulder of the diaphragm is automatically proportioned in depth to that required for its use in the valve casing.

It will be noticed that at the time one of diaphragms is being machined, there are a plurality of other diaphragms being preheated. This allows the operator to turn out the machined diaphragms as rapidly as they can be machined and since they are automatically machined to the depth required for use with standard casings, it is possible to standardize the diaphragms irrespective of their expansible qualities.

While I have shown my invention with relation to machining the abutment shoulders of diaphragms for thermostatic valves, it is obvious that it is applicable to the treatment of other members which are expansible upon change in temperature. Also while I have shown and described a machine capable of carrying out my invention, I do not desire to limit my method to use with such apparatus, nor to limit my invention of the means to the details of construction shown and described, nor in any way except as specified in the appended claims.

I claim as my invention:

1. The method of machining a thermostatic diaphragm valve so as to exactly fit a standard casing having two oppositely located valve seats which consists in seating the valve on a support, heating the valve to a temperature equal to the predetermined temperature necessary to expand the valve to closed position when in the casing and machining the valve while so heated by feeding a tool to a point fixed at a distance from said support equal to the distance between said seats.

2. The method of machining an expansible metallic member adapted to fit closely between two seats of a casing when expanded which consists in seating said member on a support, heating it to a temperature necessary to expand it to a point where it will fit closely between the seats when in the casing and machining the member while so heated by feeding a tool to a point fixed at a distance from said support equal to the distance between said seats of the casing.

FRANK VAN INWAGEN.